United States Patent [19]

Hayashi et al.

[11] Patent Number: 4,636,258
[45] Date of Patent: Jan. 13, 1987

[54] INK FOR THERMAL TRANSFER PRINTING

[75] Inventors: Seiichi Hayashi; Katsumori Takei; Takahiro Usui; Yoshitaka Yamaguchi; Makoto Taniguchi, all of Nagano, Japan

[73] Assignee: Seiko Epson Kabushiki Kaisha, Tokyo, Japan

[21] Appl. No.: 767,581

[22] Filed: Aug. 20, 1985

[30] Foreign Application Priority Data

Aug. 21, 1984 [JP] Japan .................................. 59-173845
Dec. 25, 1984 [JP] Japan .................................. 59-279302
Jan. 24, 1985 [JP] Japan .................................. 60-11340
Jan. 24, 1985 [JP] Japan .................................. 60-11341

[51] Int. Cl.[4] ............................................ C09D 11/12
[52] U.S. Cl. ........................................ 106/31; 106/20; 523/160; 523/161; 526/271; 526/272; 526/323; 524/275; 524/276; 524/559; 524/487; 524/488; 524/489; 524/854; 524/599; 524/763; 428/195
[58] Field of Search .................... 106/31, 20; 524/559, 524/854, 275, 276, 487, 488, 489, 599, 763; 523/160, 161; 526/272, 271, 323

[56] References Cited

U.S. PATENT DOCUMENTS 3,989,644 11/1976 Bolon et al. ........................... 106/31
4,178,186 12/1979 Yasui et al. ........................... 106/20

OTHER PUBLICATIONS

McGraw-Hill Dictionary of Scientific and Technical Terms, Third Edition, (1984), p. 56.

*Primary Examiner*—Melvyn I. Marquis
*Attorney, Agent, or Firm*—Blum Kaplan Friedman Silberman & Beran

[57] ABSTRACT

An ink composition for thermal transfer printing of about 30 to 50 weight percent of a masterbatch including a pigment or dye uniformly dispersed in a copolymer of at least one of styrene and an α-olefin and at least one of a maleic anhydride and a dialkyl maleate and about 50 to 70 weight percent wax or resin is provided. The ink composition is suitable for use as the ink layer of an electrothermal transfer recording sheet.

25 Claims, 1 Drawing Figure

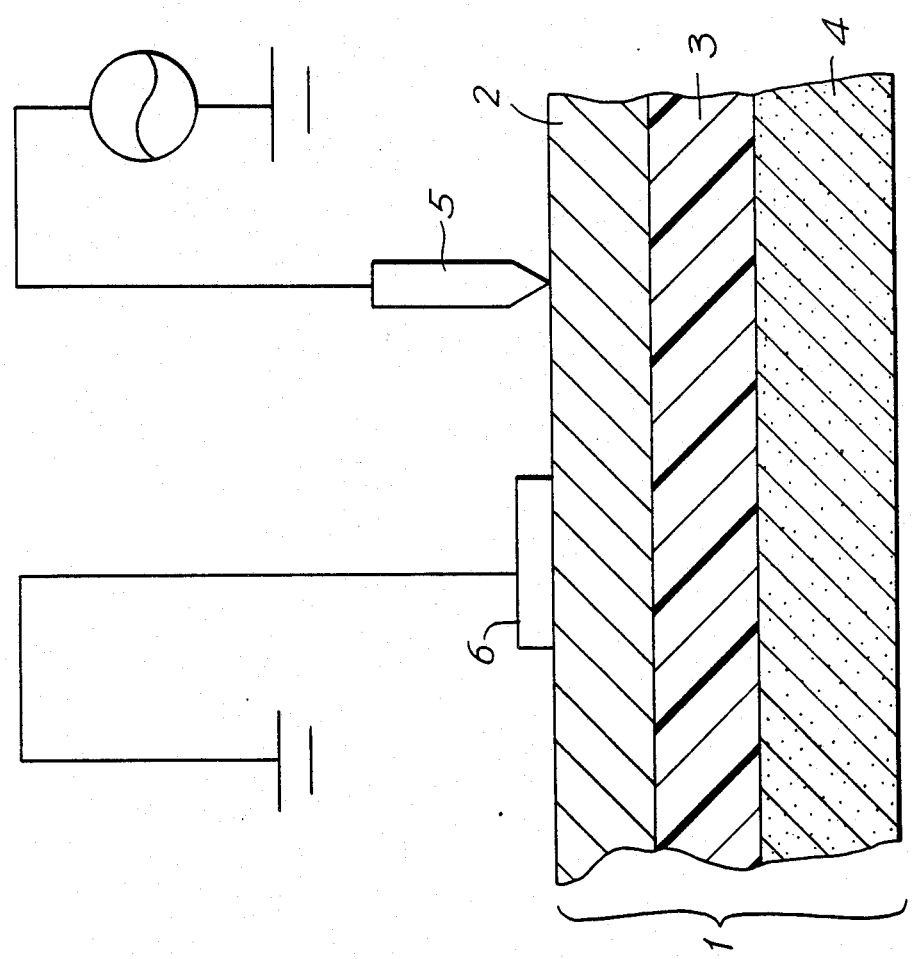

INK FOR THERMAL TRANSFER PRINTING

BACKGROUND OF THE INVENTION

This invention relates to thermal transfer printing, and more particularly to an ink composition for thermal transfer printing in which a colorant is uniformly dispersed.

Thermal transfer printing is used extensively in facsimiles, computer terminals, recorders and printers since printing is non-impact, operation is noiseless and maintenance free, cost is low, design is compact and light weight, and printing may be colored. Particularly, thermal transfer printing using an electric head is very suitable for color printing with half-tones and is receiving increased attention.

A suitable ink for thermal transfer printing must be of the hot-melt type in order to insure rapid phase change in the ink during printing (solid phase-molten phase-solid phase). Accordingly, it is necessary to disperse a colorant such as a dye or pigment in a natural or synthetic wax composed mainly of hydrocarbons and then add a defined amount of synthetic resins and plasticizers to improve adhesion and film strength.

However, it is difficult to disperse a colorant uniformly in a medium composed mainly of wax. Although mixers such as butterfly mixers, planetary mixers, sand-mill mixers, three-roll mixers and attritors have been used, they are not fully satisfactory. Even if a high-shear force is attained during mixing, colorant is not uniformly dispersed due to wax in the medium.

If colorant is not uniformly dispersed in the medium, the resulting ink composition has many disadvantages. Ink density is not uniform which reduces print quality, particularly in full-color printing. Ink transparency is also reduced, resulting in lower croma in full-color printing. Furthermore, ink cohesion is lowered, thereby reducing ink transfer to the recording paper during printing. This problem also reduces print quality since density is not uniform and print surface gloss is reduced on the recording paper.

Accordingly, it is desirable to provide an improved ink for thermal transfer printing in which colorant is uniformly dispersed.

SUMMARY OF THE INVENTION

Generally speaking, in accordance with the invention, an ink composition for thermal transfer printing in which a colorant is uniformly dispersed is provided. The ink composition is formed of about 30 to 50 weight percent of a masterbatch of copolymer and colorant dispersed therein and between about 50 to 70 weight percent wax and other resin. The copolymer is a polymer of at least one of styrene and another α-olefin and at least one of maleic anhydride and a dialkyl maleate present in the masterbatch in an amount between about 65 to 85 parts by weight. The colorant, which is dispersed in the copolymer, is present in the masterbatch in an amount between about 10 to 30 parts by weight. The ink composition is suitable for use in the ink layer of an electrothermal transfer recording sheet used for thermal transfer printing.

Accordingly, it is an object of the invention to provide an improved ink composition for thermal transfer printing.

Another object of the invention is to provide an improved ink composition for thermal transfer printing in which a colorant is uniformly dispersed.

It is still a further object of the invention to provide an improved ink composition for thermal transfer printing in which ink density is uniform.

Still another object of the invention is to provide an improved ink composition for thermal transfer printing having high ink transparency.

Yet a further object of the invention is to provide an improved ink composition for thermal transfer printing having increased cohesive properties.

Yet another object of the invention is to provide an improved masterbatch for forming an ink composition suitable for thermal transfer printing.

Still other objects and advantages of the invention will in part be obvious and will in part be apparent from the specification.

The invention accordingly comprises the several steps and the relation of one or more of such steps with respect to each of the others, the apparatus embodying features of construction, combination and arrangement of parts which are adapted to effect such steps, and the product which possesses the characteristics, properties and relation of constituents, all as exemplified in the detailed disclosure hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a cross-sectional view of an electrothermal transfer recording sheet and the manner of passage of electric current by a recording head.

DESCRIPTION OF THE PREFERRED EMBODIMENTS

The ink composition for thermal transfer printing in accordance with the invention is formed by mixing 30 to 50 weight percent of a masterbatch of copolymer and colorant dispersed therein and about 50 to 70 weight percent wax and other resin, the percentages based on the total weight of the composition. The copolymer of the masterbatch is a copolymer of at least one of styrene and another α-olefin and at least one of maleic anhydride and a dialkyl maleate and is present in the masterbatch in an amount between about 65 to 85 parts by weight. The colorant dispersed in the copolymer is present in the masterbatch in an amount between about 10 to 30 parts by weight.

The colorant is dispersed in the copolymer by using conventional dispersion mixers, such as planetary mixers, butterfly mixers, sand mills, tank mixers, attritors and three-roll mixers. Alternatively, if a pigment is used as colorant, a moist cake-like substance of the pigment may be prepared and then mixed with copolymer under vigorous agitation in order to prepare the masterbatch of the invention. This process is referred to as flushing.

Colorant must be present in the masterbatch in an amount between about 10 to 30 parts by weight. If the amount of colorant is greater than 30 parts by weight, colorant dispersion in the copolymer will be poor. If the amount of colorant is less than 10 parts by weight, ink density will be less than desireable.

When dispersing colorant in the copolymer, additives may be added in the amount of about 5 parts by weight. Suitable additives include plasticizers, viscosity regulators, dispersants, cohesive force improvers and adhesives. Additionaly, part of the wax included in the final ink composition may be also added during dispersion in a similar amount.

Copolymers suitable for the ink composition in accordance with the invention are recited below:

MA Copolymer

MA copolymer is a copolymer of an α-olefin and maleic anhydride and is prepared by dissolving or bulk copolymerizing the α-olefin and maleic anhydride in the presence of a radical initiator. The α-olefin should have between about 20 to 60 carbon atoms and be linear in structure. If the number of carbon atoms is less than 20, the melting point of the copolymer will be greater than 90° C. and ink viscosity will be higher than desireable resulting in ink dot omission during printing. If the number of carbon atoms is more than 60, colorant dispersion in the copolymer will be poor.

MA copolymer preferably has a molar ratio of maleic anhydride to α-olefin between about 1.0 to 1.5. If the ratio is less than 1.0, a portion of the α-olefin compound does not react during polymerization, thereby reducing colorant dispersion. If the molar ratio is greater than 1.5, the copolymer will be discolored and hue and chroma of the ink composition will be poor.

MA copolymer should have a mean molecular weight measured by GPC (using calibration curve for polystyrene) between about 2,000 to 30,000. If the molecular weight is less than 2,000, ink cohesion is reduced resulting in ink fracture during transfer to print paper. If the molecular weight is greater than 30,000 colorant dispersion is poor and ink viscosity is too high. Consequently, ink transfer to print paper during printing is less than satisfactory.

The melting point of MA copolymer is preferably between about 60° to 90° C. The melting point should be kept in this range since wax which is later added in order to form the ink composition also has a melting point between about 60° to 90° C.

AMM Copolymer

AMM copolymer is a copolymer of an α-olefin, maleic anhydride and a dimethyl maleate having the following structural formula:

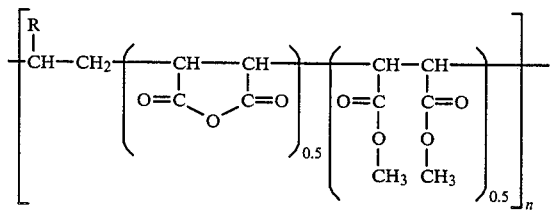

wherein R is an alkyl group having 26 to 58 carbon atoms.

The α-olefin in the AMM copolymer should have between about 28 to 60 carbon atoms and be preferably linear in structure. If the number of carbon atoms is less than 28, the melting point of the AMM copolymer will be greater than 75° C. and its viscosity at 100° C. will be greater than 250 centipoises. This in turn causes print dot ommission during ink transfer to print paper. If the number of carbon atoms is greater than 60, colorant dispersion in the copolymer is not uniform.

AMM copolymer preferably has a melting point between about 65° to 75° C. and should be kept in this range since the wax to be added to the masterbatch in order to form the ink composition also has a melting temperature within this range. The AMM copolymer should have a viscosity between about 150 to 250 centipoises at a temperature of 100° C. If the viscosity falls outside this range, colorant is not uniformly dispersed within the copolymer. In contrast, if the viscosity is within this range, final print quality is good and ink transfer to print paper is satisfactory.

SEM Copolymer

SEM copolymer is a copolymer of styrene and a diethyl maleate having the following structural formula:

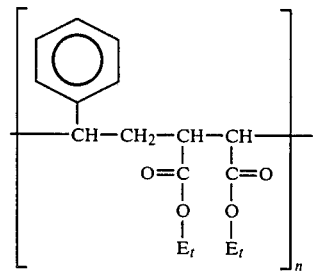

wherein Et is an ethyl group.

SEM copolymer used in the composition should have a flow point in the range of from about 55° to 70° C. (measured according to the method specified in JIS K2269). If the flow point is less than 55° C., ink fluidity during transfer to print paper increases, thereby reducing dot shape uniformity. If the flow point is greater than 70° C., the energy required for heat transfer during printing is increased, thereby causing dot ommissions on the print paper in low to medium density areas.

Preferably, the SEM copolymer has a viscosity between about 250 to 450 centipoises at 100° C. If the viscosity falls outside this range, colorant dispersion in the copolymer is reduced. In contrast, if viscosity is within this range final print quality is good and ink transfer print paper is satisfactory.

DMM Copolymer

DMM copolymer is a copolymer of an α-olefin and a dimethyl maleate having the following structural formula:

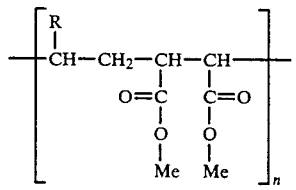

wherein R is an alkyl group having from 26 to 56 carbon atoms and Me is a methyl group.

The α-olefin of the copolymer included should have between about 28 to 60 carbon atoms and be preferably linear in structure. If the number of carbon atoms is less than 28, the melting point of the copolymer will be greater than 75° C. and its viscosity at 100° C. will be greater than 100 centipoises. This produces print dot omission in low to medium density areas in prints with half-tones. If the α-olefin has more than 60 carbon atoms, dispersion of colorant in the copolymer is not uniform.

The DMM copolymer preferably has a melting point between about 60° to 75° C. The melting point should be in this range since the wax used to form the ink composition also has a melting point between about 60° to 75°. The DMM copolymer should have a viscosity between about 30 to 100 centipoises at 100° C. If the viscosity falls outside this range, colorant is not uniformly dispersed in the copolymer. In contrast if viscosity is within this range, final print quality is good and ink transfer to print paper is satisfactory.

In accordance with the invention, the masterbatch is present in the ink composition in an amount between about 30 to 50 weight percent based on the total weight of the composition. The remainder of the ink composition is mainly wax and resin present in an amount between about 50 to 70 weight percent, based on the total weight of the composition.

Suitable waxes for forming the composition include paraffin wax, microcrystalline wax, carnauba wax, oxidized wax and low-molecular-weight polyethylene wax. The wax should be present in an amount between about 30 to 65 weight percent based on the total weight of the composition when used with resin.

Suitable resins for forming the ink composition are chosen from synthetic resins such as ethylene/vinyl acetate copolymer (EVA), ethylene/ethyl acrylate copolymer (EEA), polyethylene, polyvinyl butyral, polyamide and polyester. The resin should be present in an amount between about 5 to 20 weight percent based on the total weight of the composition in order to promote ink cohesion.

The following examples further illustrate the ink composition in accordance with the invention but are not intended to limit its scope.

EXAMPLE 1

250 grams of an α-olefin having between 28 to 55 carbon atoms, 40 grams of maleic anhydride and 300 grams of xylene were placed in a separable flask fitted with a cooler and then heated and stirred at a temperature of about 115° C. in a nitrogen atmosphere in order to promote copolymerization. Copolymerization continued for a period of about 5 hours using 5.1 grams of t-butyl peroctoate as catalyst, which was added at the start of the reaction, 1 hour after the reaction and two hours after the reaction. At the end of the 5 hour time period, the solution was transferred to an evaporator whereby most of the xylene was distilled off at normal temperature. The remaining xylene as well as the maleic anhydride were then removed under reduced pressure, leaving 278 grams of MA copolymer.

The MA copolymer formed had a melting point of 75° C. (DSC; heating speed: 10° C. per minute) and a mean molecular weight of 8500 (GPC method; calibration curve for standard polyethylene used as reference).

EXAMPLES 2 AND 3
COMPARATIVE EXAMPLES 1-6

The MA copolymer prepared in Example 1 was mixed with phthalocyanine blue in a planetary mixer at 120° C. for 30 minutes in varying proportions as set forth in Table 1. These mixtures were cooled to form solidified products which were pulverized to form a powder. The powders were kneaded on a three-roll mill in order to disperse the phthalocyanine blue. The rear and middle rolls were heated at a temperature of about 70° C. and the front roll was cooled with water. After 5 passes, masterbatches of Examples 2-3 and Comparative Examples 1-2 were produced.

Separately, paraffin wax, microcrystalline wax, carnauba wax, and oxidized wax (Nippon Seiko Co., Ltd.) were mixed with phthalocyanine blue in place of the MA copolymer as shown in Table 1. These mixtures were cooled, solidified, and pulverized in order to form a powder and kneaded on a three-roll mill in order to disperse the pigment resulting in the masterbatches of Comparative Examples 3-6.

In order to evaluate dispersion uniformity of phthalocyanine blue, each masterbatch was examined under a microscope. Additionally, in order to evaluate transparency, a thin coat of each masterbatch was coated onto a polyester film of about 10 μm thickness eith a bar coater having a wire size of about 6 μm and then visually observed.

TABLE 1

| | Resin or Wax Type | (wt. part) | Pigment (wt. part) | Dispersion of Pigment | Transparency |
|---|---|---|---|---|---|
| Comp. Ex. 1 | MA copolymer | 95 | 5 | O | O |
| Example 2 | MA copolymer | 85 | 15 | O | O |
| Example 3 | MA copolymer | 75 | 25 | O | O |
| Comp. Ex. 2 | MA copolymer | 65 | 35 | X | Δ |
| Comp. Ex. 3 | Paraffin wax | 75 | 25 | X | X |
| Comp. Ex. 4 | Microcrystalline wax | 75 | 25 | X | X |
| Comp. Ex. 5 | Carnauba wax | 75 | 25 | Δ | Δ |
| Comp. Ex. 6 | Oxidized wax (NPS 9210) | 75 | 25 | Δ | Δ |

O: Excellent;
Δ: Fair;
X: Poor

Although the masterbatch of Comparative Example 1 exhibited excellent transparency and colorant dispersion, it was nevertheless not fully satisfactory. When the masterbatch of Comparative Example 1 was combined with a wax mixture in order to form an ink composition, the ink composition contained insufficient colorant.

Examples 2 and 3 describe masterbatches prepared in accordance with invention exhibiting high transparency and excellent colorant dispersion. When the ratios of pigment to AM copolymer exceed a certain level, these properties deteriorate as shown in Comparative Examples 2 wherein the amount of colorant is greater than 30 parts by weight.

If the masterbatch is formed by directly dispersing colorant in carnauba wax or oxidized wax, as in Comparative Examples 5-6, colorant dispersion and transparency are merely adequate—poorer results than obtained when using AM copolymer. If the masterbatch is formed by directly dispersing colorant in paraffin wax or microcrystalline wax, as in Comparative Examples 3-4, colorant dispersion is not uniform and the ink compositions formed are opaque in color.

EXAMPLES 4-11
COMPARATIVE EXAMPLES 7-10

The masterbatches of Example 2 and Comparative Example 6 were mixed with a wax and optionally a resin in varying proportions as shown in Table 2. The mixtures were kneaded in a planetary mixer for one hour at a temperature of about 120° C. in order to form various ink compositions.

Using each ink composition, an electrothermal transfer recording sheet 1, as illustrated in FIG. 1, was prepared. Sheet 1 included a support layer 3, a current-passing resistance layer 2 bound to support layer 3 on one surface and an ink layer 4 deposited on the opposed surface of support layer 3. Support layer 3 was made satisfactory if the masterbatch does not include MA copolymer for pigment dispersion.

On the other hand, the compositions of Examples 4–11 provide excellent print quality during thermal transfer printing in which the ink composition used is manufactured in accordance with the invention. These ink compositions contain MA masterbatch in an amount between about 30 to 50 weight percent. As a result, print quality is superior to that using conventional ink compositions.

TABLE 2

|  | Color Masterbatch | (Part) | Wax | (Part) | Resin | (Part) | Uniformity of Dots | Clearness of Prints | Gloss of Prints | Cohesive Fracture of Ink |
|---|---|---|---|---|---|---|---|---|---|---|
| Example 4 | Composition of Example 2 | 40 | Paraffin wax | 60 | — | — | O | O | O | O (no fracture) |
| Example 5 | Composition of Example 2 | 40 | Carnauba wax | 60 | — | — | O | O | O | O |
| Example 6 | Composition of Example 2 | 40 | Oxidized wax | 60 | — | — | O | O | O | O |
| Example 7 | Composition of Example 2 | 35 | Paraffin wax | 60 | EVA | 5 | O | O | O | O |
| Example 8 | Composition of Example 2 | 35 | Paraffin wax | 60 | EEA | 5 | O | O | O | O |
| Example 9 | Composition of Example 2 | 35 | Paraffin wax | 60 | Polyvinyl butyral | 5 | O | O | O | O |
| Comp. Ex. 7 | Composition of Example 2 | 25 | Carnauba wax | 70 | Polyamide | 5 | x | X | X | X (fracture) |
| Example 10 | Composition of Example 2 | 35 | Carnauba wax | 60 | Polyamide | 5 | O | O | O | O |
| Example 11 | Composition of Example 2 | 45 | Carnauba wax | 50 | Polyamide | 5 | O | O | O | O |
| Comp. Ex. 8 | Composition of Example 2 | 55 | Carnauba wax | 45 | Polyamide | 5 | X | X | X | O |
| Comp. Ex. 9 | Composition of Comp. Ex. 6 | 35 | Carnauba wax | 60 | Polyamide | 5 | X | X | X | X |
| Comp. Ex. 10 | Composition of Comp. Ex. 6 | 40 | Carnauba wax | 60 | — | — | X | X | X | X | from a biaxially stretched polyethylene terephthalate film having a thickness of 10 μm. Resistance layer 2 was carbon black in a resin binder and had a resistance of 7.5 KΩ/□. Ink layer 4 was applied to sheet 1 by melt coating the ink composition with a bar coater and had a thickness of 5 μm.

Transfer recording sheet was placed in contact with a recording electrode 5 and a return electrode 6 during thermal transfer printing. A grey scale (cyan color) was printed on thermal transfer paper (TTR, Mitsubishi Paper Mills, Ltd.) under the following conditions:
Head-pointer size: 60 μm;
Impressed voltage: 25 V;
Pulse-width modulation: 50 μsec to 2 msec.

For each ink composition prepared, print quality was evaluated. Specifically, dot uniformity was examined under a microscope, clarity was determined by visual observation, gloss was determined by visual observation and cohesive fracture was examined by determining the portion of ink that remained on transfer recording sheet 1. The results of these tests are summarized in Table 2 in which O means excellent and x means poor.

Comparative Example 7 shows that print quality is poor if the masterbatch of the invention is present in the ink composition in an amount less than about 30 weight percent. Similarly, Comparative Example 8 shows that print quality is also poor if the masterbatch of the invention is present in the ink composition in an amount greater than about 50 weight percent. The remaining comparative Examples 9 and 10 in Table 2 provide convincing evidence that ink print quality is less than

EXAMPLES 12–13

COMPARATIVE EXAMPLES 11–16

An AMM copolymer containing α-olefin having 30 to 55 carbon atoms, a melting point of 70° C. (DSC; heating speed: 10° C./min) and a viscosity of 190 centpoises at 100° C. (Toyohseiki Inc., Rheolograph-sol No. 653), was mixed with phthalocyanine blue using a planetary mixer at 120° C. for 30 minutes in the varying proportions set forth in Table 3. These mixtures were then cooled in order to form solidified products which were pulverized to a powder. The resulting powders were kneaded on a three-roll mill in order to disperse the phthalocyanine blue. The rear and middle rolls of the mill were heated to a temperature of about 72° C. and the front roll was cooled with water. After 8 passes, masterbatches of Examples 12–13 and Comparative Examples 11-After 8 passes, 12 were produced.

Separately, paraffin wax, microcrystalline wax, carnauba wax and oxidized wax (Nippon Seiro Co., Ltd.) were mixed with phthalocyamine blue in place of the MMA copolymer as shown in Table. These mixtures were then cooled, solidified and pulverized in order to form a powder and kneaded on the three-roll mill to disperse the pigment resulting in the masterbatches of Comparative Examples 13–16.

In order to evaluate dispersion uniformity of phthalocyane blue, each masterbatch was examined under a microscope. Additionally, in order to evaluate transparency, a thin coat of each masterbatch was coated onto a polyester film of 10 μm thickness with a bar coater having a wire size of 8 μm and then visually observed.

TABLE 3

| | Resin or Wax | | Pigment (wt. part) | Dispersion of Pigment | Transparency |
|---|---|---|---|---|---|
| | Type | (wt. part) | | | |
| Comp. Ex. 11 | AMM copolymer | 93 | 7 | O | O |
| Example 12 | " | 85 | 15 | O | O |
| Example 13 | " | 73 | 27 | O | O |
| Comp. Ex. 12 | " | 65 | 35 | X | Δ |
| Comp. Ex. 13 | Paraffin wax | 73 | 27 | X | X |
| Comp. Ex. 14 | Microcrystalline wax | 73 | 27 | X | X |
| Comp. Ex. 15 | Carnauba wax | 73 | 27 | Δ | Δ |
| Comp. Ex. 16 | Oxidized wax (NPS 9210) | 73 | 27 | Δ | Δ |

O: Excellent;
Δ: Fair;
X: Poor

Although the masterbatch of Comparative Example 11 exhibited excellent transparency and colorant dispersion, it was not fully satisfactory. When the masterbatch of Comparative Example 11 was combined with a wax mixture in order to form an ink composition, the ink composition provided excessively low color density.

Examples 12 and 13 describe masterbatches in accordance with the invention exhibiting high transparency and excellent colorant dispersion. When the ratio of pigment to AMM copolymer exceeds a certain level, these properties deteriorate as shown in Comparative Example 12 wherein the amount of colorant is greater than 30 parts by weight.

If the masterbatch is formed by directly dispersing colorant in carnauba wax or oxidized wax, as in Comparative Examples 15–16, colorant dispersion and transparency are merely adequate—poorer results than obtained when using AMM copolymer. If the masterbatch is formed by directly dispersing colorant in paraffin wax or microcrystalline wax, as in Comparative Examples 13–14, colorant dispersion is not uniform and the ink compositions are opaque in color.

EXAMPLES 14–19

COMPARATIVE EXAMPLES 17–20

The masterbatches of Example 12 and Comparative Example 16 were mixed with a wax and optionally a resin in varying proportions as set forth in Table 4. The mixtures were kneaded on a planetary mixer for one hour at a temperature of about 120° C. in order to form the various ink compositions.

Using each ink composition, an electrothermal transfer recording sheet 1 illustrated in FIG. 1 and described in connection with Example 1 was prepared. Support layer 3 was a synthetic resin film biaxially stretched polyethylene terephthalate film having a thickness of 6 μm. Resistance layer 2 was carbon black in resin binder with a resistance of 50 KΩ/□. Ink layer 4 was applied to sheet 1 by melt coating the ink composition with a bar coater and had a thickness of 6.5 μm.

Transfer recording sheet was placed in contact with recording electrode 5 and return electrode 6 during thermal transfer printing. A grey scale (cyan color) was presented on thermal transferpaper (TTR, Mitsubishi Paper Mills, Ltd.) under the following conditions:
  Head-pointer size: 60 μm;
  Impressed voltage 30 V;
  Pulse-width modulation: 50 μsec. to 2 msec.

For each ink composition prepared, printing quality was evaluated. Specifically, dot uniformity was examined under a microscope, clarity was determined by visual observation, gloss was determined also by visual observation and cohesive fracture was examined by determining the portion of ink that remained on transfer recording sheet 1. The results of these tests are summarized in Table 4 in which O means excellent and x means poor.

Comparative Example 17 shows that print quality is poor if the masterbatch of the invention is present in an amount less than about 30 weight percent. Similarly, Comparative Example 18 shows that print quality is also poor if the masterbatch of the invention is included in the ink composition in an amount greater than about 50 weight percent. Comparative Examples 19 and 20 in Table 4 provide convincing evidence that ink print quality is less than satisfactory if the masterbatch does not include AMM copolymer.

The copolymers of Examples 14–19 provide excellent print quality during thermal transfer printing when the ink composition used is manufactured in accordance with the invention. These ink compositions contain AMM masterbatch in an amount between 30 to 50 weight percent. As a result, print quality is superior to that using conventional ink compositions.

TABLE 4

| | Color Masterbatch | (Part) | Wax | (Part) | Resin | (Part) | Uniformity of Dots | Clearness of Prints | Gloss of Prints | Cohesive Fracture of Ink |
|---|---|---|---|---|---|---|---|---|---|---|
| Example 14 | Composition of Example 12 | 40 | Paraffin wax | 60 | — | — | O | O | O | O (no fracture) |
| Example 15 | Composition of Example 12 | 40 | Carnauba wax | 60 | — | — | O | O | O | O |
| Example 16 | Composition of Example 12 | 40 | Paraffin wax | 52 | EVA | 8 | O | O | O | O |
| Example 17 | Composition of Example 12 | 40 | Paraffin wax | 52 | EVA | 8 | O | O | O | O |
| Comp. Ex. 17 | Composition of Example 12 | 25 | Paraffin wax | 70 | Polyamide | 5 | x | X | X | X (fracture) |
| Example 18 | Composition of Example 12 | 35 | Paraffin wax | 60 | Polyamide | 5 | O | O | O | O |
| Example 19 | Composition of Example 12 | 45 | Paraffin wax | 50 | Polyamide | 5 | O | O | O | O |
| Comp. Ex. 18 | Composition of Example 12 | 55 | Paraffin wax | 45 | Polyamide | 5 | X | X | X | O |

TABLE 4-continued

| | | Color Masterbatch | (Part) | Wax | (Part) | Resin | (Part) | Uniformity of Dots | Clearness of Prints | Gloss of Prints | Cohesive Fracture of Ink |
|---|---|---|---|---|---|---|---|---|---|---|---|
| Comp. Ex. 19 | Composition of Comp. Ex. 16 | | 35 | Paraffin wax | 60 | Polyamide | 5 | X | X | X | X |
| Comp. Ex. 20 | Composition of Comp. Ex. 16 | | 40 | Paraffin wax | 60 | — | — | X | X | X | X |

EXAMPLES 20-21

COMPARATIVE EXAMPLES 21-26

An SEM copolymer having a flow point temperature of about 60° C. (JIS K2269) and a viscosity of about 375 centipoises at a temperature of about 150° C. (Rhedograph-Sol No. 653) was mixed with phthalocyanine blue using a planetary mixer at 160° C. for 30 minutes in varying porportions as set forth in Table 5. These mixtures were cooled in order to form solidified products. The products were then pulverized to form a powder. The resulting powders were kneaded on a three-roll mill in order to disperse the phthalocyanine blue. The rear and middle rolls of the mills were heated to a temperature of about 78° C. and the front roll was cooled with water. After 10 passes, masterbatches of Examples 20-21 and Comparative Examples 21-22 were produced.

Separately, paraffin wax, microcrystalline wax, carnauba wax and oxidized wax (Nippon Seiro Co., Ltd.) were mixed with phthalocyanine blue in the proportions shown in Table 5. These mixtures were then cooled, solidified, and pulverized in order to form a powder and kneaded on the three-roll mill in order to disperse the pigment resulting in the masterbatches of Comparative Examples 23-26.

In order to evaluate the dispersion uniformity of phthalocyanine blue, each masterbatch was examined under a microscope. In order to evaluate transparency, a thin coat of each masterbatch was coated onto a polyester film of about 12 μm thick with a bar coater having a wire size of about 8 μm and then visually observed.

TABLE 5

| | Resin or Wax | | | | Transparency |
|---|---|---|---|---|---|
| | Type | (wt. part) | Pigment (wt. part) | Dispersion of Pigment | |
| Comp. Ex. 21 | SEM copolymer | 95 | 5 | O | O |
| Example 20 | " | 85 | 15 | O | O |
| Example 21 | " | 75 | 25 | O | O |
| Comp. Ex. 22 | " | 65 | 35 | X | Δ |
| Comp. Ex. 23 | Paraffin wax | 75 | 25 | X | X |
| Comp. Ex. 24 | Microcrystalline wax | 75 | 25 | X | X |
| Comp. Ex. 25 | Carnauba wax | 75 | 25 | Δ | Δ |
| Comp. Ex. 26 | Oxidized wax (NPS 9210) | 75 | 25 | Δ | Δ |

O: Excellent;
Δ: Fair;
X: Poor

Although the masterbatch of Comparative Example 21 exhibited excellent transparency and colorant dispersion, it was not fully satisfactory. When the masterbatch of Comparative Example 21 was combined with a wax mixture in order to form an ink composition, the ink composition provided excessively low color density.

Examples 20 and 21 describe masterbatches prepared in accordance with the invention exhibiting high transparency and excellent colorant dispersion. When the ratio of pigment to SEM copolymer exceeds a certain level, these properties deteriorate as shown in Comparative Example 22 wherein the amount of colorant is greater than 30 parts by weight.

If the masterbatch is formed by directly dispersing colorant in carnauba wax or oxidized wax, as in Comparative Examples 25-26, colorant dispersion and transparency are merely adequate—poorer results than obtained when using SEM copolymer. If the masterbatch is formed by directly dispersing colorant in parrafin wax or microcrystalline wax, as Comparative Examples 23-24, colorant dispersion is not uniform and the ink compositions formed therefrom are opaque in color.

EXAMPLES 22-26

COMPARATIVE EXAMPLES 27-30

The masterbatches of Example 20 and Comparative Example 26 were mixed with a wax and optionally a resin in varying proportions as set forth in Table 6. The mixtures were kneaded in a planetary mixer for 30 minutes at a temperature of about 130° C. in order to form the various ink compositions.

Using each ink composition, the electrothermal transfer recording sheet 1 as illustrated in FIG. 1 was prepared. Support layer 3 was a biaxially stretched PET film with a thickness of 6 μm. Resistance layer 2 had a resistance of 5.5 KΩ/□. Ink layer 4 was applied to sheet 1 by melt coating to a thickness of 6 μm.

Transfer recording sheet 1 was placed in contact with recording electrode 5 and return electrode 6 during thermal transfer printing. A grey scale (cyan color) was printed on thermal transfer paper (TTR, Mitsubishi Paper Mills, Ltd.) under the following conditions:

Head-pointer size: 55 μm:
Impressed voltage: 25 V;
Pulse width modulation: 50 μsec to 2 msec.

For each ink composition prepared, print quality was evaluated. Specifically, dot uniformity was examined under a microscope, clarity was determined by visual observation, gloss was determined by visual observation, and cohesive fracture was judged by determining the portion of ink that remained on transfer recording sheet 1. The results of these tests are summarized in Table 6 in which O means excellent and x means poor.

Comparative Example 27 shows that print quality is poor if the masterbatch of the invention is present in the ink composition in amount less than almost 30 weight percent. Similarly, Comparative Example 28 shows that print quality is also poor if the masterbatch of the invention is included in the ink composition in an amount greater than about 50 weight percent. Comparative Examples 29 and 30 in Table 6 provide convincing evidence that ink print quality is less than satisfactory if the masterbatch does not include SEM copolymer.

The compositions of Examples 22-28 provide excellent print quality during thermal transfer printing when the ink composition used is manufactured in accordance with the invention. The ink composition contains SEM masterbatch in an amount between 30 to 50 weight percent. As a result, print quality is superior to that using conventional ink compositions.

TABLE 6

| | Color Masterbatch | (Part) | Wax | (Part) | Resin | (Part) | Uniformity of Dots | Clearness of Prints | Gloss of Prints | Cohesive Fracture of Ink |
|---|---|---|---|---|---|---|---|---|---|---|
| Example 22 | Composition of Example 20 | 35 | Paraffin wax | 65 | — | — | O | O | O | O (no fracture) |
| Example 23 | Composition of Example 20 | 35 | Carnauba wax | 65 | — | — | O | O | O | O |
| Example 24 | Composition of Example 20 | 35 | Oxidized wax | 65 | — | — | O | O | O | O |
| Example 25 | Composition of Example 20 | 40 | Paraffin wax | 55 | EVA | 5 | O | O | O | O |
| Example 26 | Composition of Example 20 | 40 | Paraffin wax | 55 | Polyamide | 5 | O | O | O | O |
| Comp. Ex. 27 | Composition of Example 20 | 25 | Paraffin wax | 70 | Polyvinyl butyral | 5 | x | X | X | X (fracture) |
| Example 27 | Composition of Example 20 | 35 | Paraffin wax | 60 | Polyvinyl butyral | 5 | O | O | O | O |
| Example 28 | Composition of Example 20 | 45 | Paraffin wax | 50 | Polyvinyl butyral | 5 | O | O | O | O |
| Comp. Ex. 28 | Composition of Example 20 | 55 | Paraffin wax | 40 | Polyvinyl butyral | 5 | X | X | X | O |
| Comp. Ex. 29 | Composition of Comp. Ex. 26 | 35 | Paraffin wax | 60 | Polyvinyl butyral | 5 | X | X | X | X |
| Comp. Ex. 30 | Composition of Comp. Ex. 26 | 40 | Paraffin wax | 60 | — | — | X | X | X | X |

TABLE 7

| | Resin or Wax Type | (wt. part) | Pigment (wt. part) | Dispersion of Pigment | Transparency |
|---|---|---|---|---|---|
| Comp. Ex. 31 | DMM copolymer | 93 | 7 | O | O |
| Example 29 | " | 85 | 15 | O | O |
| Example 30 | " | 75 | 25 | O | O |
| Comp. Ex. 32 | " | 65 | 35 | X | |
| Comp. Ex. 33 | Paraffin wax | 75 | 25 | X | X |
| Comp. Ex. 34 | Microcrystalline wax | 75 | 25 | X | X |
| Comp. Ex. 35 | Carnauba wax | 75 | 25 | Δ | Δ |
| Comp. Ex. 36 | Oxidized wax (NPS 9210) | 75 | 25 | Δ | Δ |

O: Excellent;
Δ: Fair;
X: Poor

EXAMPLES 29-30
COMPARATIVE EXAMPLE 31-36

A DMM copolymer containing α-olefin having 30 to 55 carbon atoms and had a melting point of 66° C. (DSC; heating speed: 10° C./min.) and a viscosity of 60 centipoises at a temperature of 100° C. (Rheolographsol No. 653) was mixed with phthalocyanine blue using a planetary mixer in varying proportions as set forth in Table 7. These mixtures were cooled in order to form solidified products. The products were then pulverized to form a powder. The resulting powders were kneaded on a three roll mill in order to disperse the phthalocyanine blue. The rear and middle rolls of the mill were heated to about 65° C. and the front roll was cooled with water. After 8 passes, the masterbatches of Examples 29-30 and Comparative Examples 31-32 were produced.

Separately, parrafin wax, micrystalline wax, carnauba wax and oxidized wax (NP5 9210; Nippon Seiro Co., Ltd.) were mixed with phthalocyanine blue in the proportions shown in Table 7. These mixtures were then cooled, solidified, and pulverized to form a powder and kneaded on the three-roll mill to disperse the pigment resulting in the masterbatches of Comparative Examples 33-36.

In order to evaluate dispersion uniformity of phthalocyanine blue, each masterbatch was examined under a microscope. Additionally, in order to examine transparency, a thin coat of each masterbatch was coated onto a polyester film of about 12 μm thick with a bar coater having a wire size of about 8 μm thick and then visually observed.

Although the masterbatch of Comparative Example 31 exhibited excellent transparency and colorant dispersion, it was not fully satisfactory. When the masterbatch of Comparative Example 31 was combined with a wax mixture in order to form an ink composition, the ink composition provided excessively low color density.

Examples 29 and 30 describe masterbatches prepared in accordance with the invention which exhibit high transparency and excellent colorant dispersion. When the ratio of pigment to DMM copolymer exceeds a certain level, these properties deteriorate as shown in Comparative Example 32 wherein the amount of colorant exceeds 30 parts by weight.

If the masterbatch is formed by directly dispersing colorant in carnauba wax or oxidized wax, as in Comparative Examples 35-36, colorant dispersion and transparency are merely adequate—poorer than obtained when using DMM copolymers. If the masterbatch is formed by directly dispersing colorant in parrafin wax or microcrystalline wax, as in Comparative Examples 33-34, colorant dispersion is not uniform and the ink compositions formed are opaque in color.

EXAMPLES 31-37
COMPARATIVE EXAMPLES 37-40

The masterbatches of Example 29 and Comparative Example 36 were mixed with a wax and optionally a resin in the varying porportions as set forth in Table 8. The mixtures were kneaded in a planetary mixer for one hour at a temperature of about 110° C. in order to form the various ink compositions.

Using each ink composition, an electrothermal transfer recording sheet 1, as illustrated in FIG. 1, was prepared. Support layer 3 was a biaxially stretched polyethelene terephthalate film having a thickness of 6 μm. Resistance layer 2 was carbon black in a resin binder with a resistance value of 5.5 KΩ/□. Ink layer 4 was applied to sheet 1 by melt coating the ink composition with a bar coater and had a thickness of 5.5 μm.

Transfer recording sheet 1 was placed in contact with recording electrode 5 and return electrode 6 during thermal transfer printing. A grey scale cyan color was on thermal transfer paper (TTR, Mitsubishi Paper Mills, Ltd.) in which Head-pointer size was: 60 μm
Impressed Voltage: 25 V;
Pulse-width molulation in a range of 100 μsec to 3 msec.

For each ink composition prepared, print quality was evaluated. Specifically, dot uniformity was examined under a microscope, clarity was determined by visual observation, gloss was determined also by visual observation and cohesive fracture was judged by determining the portion of ink that remained on transfer recording sheet 1. The results of these tests are summarized in Table 8 in which O means excellent and x means poor.

ink print quality is less than satisfactory if the masterbatch does not include DMM copolymer.

The Compositions of Examples 31-37 provide excellent print quality during thermal transfer printing when the ink composition used is manufactured in accordance with the invention. These ink compositions contain DMM masterbatch in an amount between 30 to 50 weight percent. As a result, print quality is superior to that using conventional ink compositions.

Accordingly, an improved ink composition for thermal transfer printing is prepared by dispersing 10-30 parts by weight of colorant in 65-85 parts by weight of copolymer of at least one of styrene and another α-olefin and at least one of maleic anhydride and a dialkyl maleate in order to form a masterbatch. The masterbatch is then mixed with wax and optionally another resin in order to form the ink composition of the invention.

The ink composition prepared in accordance with the invention is superior to other ink compostions used for thermal transfer printing. Print quality is superior compared to the print quality of thermal transfer printers with conventional inks. Dot uniformity, clarity and transparency are improved and cohesive fracture is eliminated. Additionally, the ink composition of the invention is suitable for use in various thermal transfer printers including printers having a mechanical print head or an electric print head.

It will thus be seen that the objects set forth above, among those made apparent from the preceding description, are efficiently attained and, since certain changes may be made in carrying out the above process, in the described product, and in the article set forth without departing from the spirit and scope of the invention, it is intended that all matter contained in the

TABLE 8

| | Color Masterbatch | (Part) | Wax | (Part) | Resin | (Part) | Uniformity of Dots | Clearness of Prints | Gloss of Prints | Cohesive Fracture of Ink |
|---|---|---|---|---|---|---|---|---|---|---|
| Example 31 | Composition of Example 29 | 45 | Paraffin wax | 55 | — | — | O | O | O | O (no fracture) |
| Example 32 | Composition of Example 29 | 45 | Oxidized wax | 55 | — | — | O | O | O | O |
| Example 33 | Composition of Example 29 | 35 | Paraffin wax | 55 | Polyethylene | 10 | O | O | O | O |
| Example 34 | Composition of Example 29 | 35 | Paraffin wax | 55 | EVA | 10 | O | O | O | O |
| Example 35 | Composition of Example 29 | 35 | Paraffin wax | 55 | Polyvinyl butyral | 10 | O | O | O | O |
| Comp. Ex. 37 | Composition of Example 29 | 25 | Paraffin wax | 70 | Nylon 12 | 5 | x | X | X | X (fracture) |
| Example 36 | Composition of Example 29 | 35 | Paraffin wax | 60 | Nylon 12 | 5 | O | O | O | O |
| Example 37 | Composition of Example 29 | 45 | Paraffin wax | 50 | Nylon 12 | 5 | O | O | O | O |
| Comp. Ex. 38 | Composition of Example 29 | 55 | Paraffin wax | 40 | Nylon 12 | 5 | X | X | X | O |
| Comp. Ex. 39 | Composition of Comp. Ex. 36 | 35 | Paraffin wax | 60 | Nylon 12 | 5 | X | X | X | X |
| Comp. Ex. 40 | Composition of Comp. Ex. 36 | 40 | Paraffin wax | 60 | — | — | X | X | X | X |

Comparative Example 37 shows that print quality is poor if the masterbatch of the invention is present in the ink composition in an amount less than about 30 weight percent. Similarly, Comparative Example 38 shows that print quality is poor if the masterbatch of the invention is included in the ink composition in an amount greater than about 50 weight percent. Comparative Examples 39 and 40 in Table 8 provide convincing evidence that above description and shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in the singular are intended to include compatible mixtures of such ingredients whereever the sense permits.

What is claimed:

1. An ink composition for thermal transfer printing comprising a masterbatch, said masterbatch including between about 65 to 85 parts by weight of a copolymer of at least one of styrene and another α-olefin and at least one of maleic anhydride and a dialkyl maleate, and said masterbatch further including between about 10 to 35 parts by weight of a colorant dispersed in the copolymer, the masterbatch present in an amount between about 30 to 50 weight percent based on the total weight of the composition, the balance of the composition being comprised of wax.

2. The ink composition of claim 1, wherein said copolymer is an α-olefin and maleic anhydride copolymer.

3. The ink composition of claim 2, wherein the α-olefin has between about 20 to 60 carbon atoms.

4. The ink composition of claim 2, wherein the molar ratio of maleic anhydride to α-olefin is between 1.0 to 1.5.

5. The ink composition of claim 2, wherein the copolymer has an average molecular weight between about 2,000 to 30,000.

6. The ink composition of claim 2, wherein the copolymer has a melting point between about 60° to 90° C.

7. The ink composition of claim 1, wherein the copolymer is an α-olefin, maleic anhydride and a dimethyl maleate copolymer having the following structural formula:

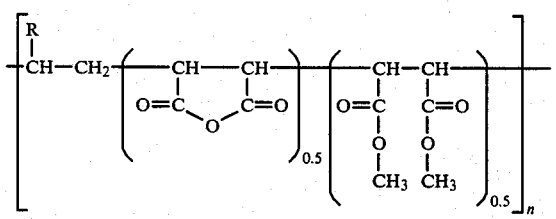

wherein R is an alkyl group of 26 to 58 carbon atoms.

8. The ink composition of claim 7, wherein the α-olefin has between about 28 to 60 carbon atoms.

9. The ink composition of claim 7, wherein the copolymer has a melting point between about 65° to 75° C.

10. The ink composition of claim 7, wherein the copolymer has a viscosity between about 150 to 250 centipoises at 100° C.

11. The ink composition of claim 1, wherein the copolymer is a styrene and diethyl maleate copolymer having the following structural formula:

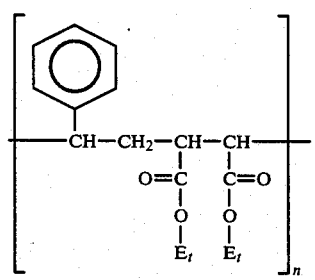

wherein Et represents ethyl.

12. The ink composition of claim 11, wherein the copolymer has a flow point temperature between about 55° to 70° C.

13. The ink composition of claim 11, wherein the copolymer has a viscosity between about 250 to 450 centipoises at 100° C.

14. The ink composition of claim 1, wherein the copolymer is an α-olefin and dimethyl maleate copolymer having the following structural formula:

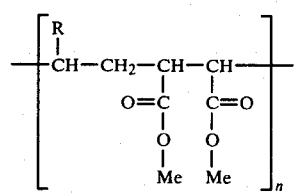

15. The ink composition of claim 14 wherein the α-olefin has between about 28 to 60 carbon atoms.

16. The ink composition of claim 14, wherein the copolymer has a melting point between about 60° to 75° C.

17. The ink composition of claim 14, wherein the copolymer has a viscosity between about 30 to 100 centipoises at 100° C.

18. The ink composition of claim 1, wherein the masterbatch further includes at least one additive which functions as a plasticizer, viscosity regulator, dispersant, cohesive force improver or adhesive.

19. The ink composition of claim 18, wherein the additives are present in an amount of up to about 5 parts by weight.

20. The ink composition of claim 19, wherein the masterbatch further includes wax in an amount of up to about 5 parts by weight.

21. The ink composition of claim 1, wherein the wax is selected from the group consisting of paraffin wax, microcrystalline wax, carnauba wax, oxidized wax and mixtures thereof.

22. The ink of claim 1, further including another resin in an amount between about 5 to 20 weight percent based on the total weight of the composition.

23. The ink of claim 22, wherein the resin is selected from the group consisting of of ethylene/vinyl acetate copolymer, ethylene/ethyl acrylate copolymer, polyethylene, polyvinyl butyral, polyamide, polyester and mixtures thereof.

24. A method for preparing an ink composition for thermal transfer printing comprising:
preparing a copolymer of at least one of styrene and another α-olefin and at least one of maleic anhydride and a dialkyl maleate;
dispersing a colorant in the copolymer in order to form a masterbatch, the copolymer present in the masterbatch in an amount between about 65 to 85 parts by weight and the colorant present in the masterbatch in an amount between about 10 to 30 parts by weight; and
adding at least a wax to said masterbatch in order to form the ink composition, said masterbatch present in an amount between 30 to 50 weight percent based on the total weight of the ink composition and said wax present in an amount between 50 to 70 weight percent based on the total weight of the ink composition.

25. An ink composition for thermal transfer printing, comprising about 30 to 50 weight percent of a masterbatch, said masterbatch including between about 65 to 85 parts by weight of a copolymer of at least one of styrene and another α-olefin and at least one of maleic anhydride and a dialkyl maleate, and said masterbatch further including between about 10 to 35 parts by weight of a colorant dispersed in the copolymer; and the remainder of the composition being wax or wax and another resin.

* * * * *